United States Patent

[11] 3,576,522

[72] Inventors William E. N. Doty
Houston, Tex.;
Donald E. Dunster; Douglas S. Sullivan,
Ponca City, Okla.
[21] Appl. No. 569,227
[22] Filed Aug. 1, 1966
[45] Patented Apr. 27, 1971
[73] Assignee Continental Oil Company
Ponca City, Okla.

[54] METHOD AND APPARATUS FOR ANALOG VELOCITY FILTERING
2 Claims, 13 Drawing Figs.
[52] U.S. Cl. .................................................. 340/15.5
[51] Int. Cl. .................................................. G01v 1/28
[50] Field of Search ........................................... 340/3 (M),
15. (S), 15. (SC), (Geophysics)

[56] References Cited
UNITED STATES PATENTS
3,142,815 7/1964 Picou ........................... (340/15.5C)
3,274,541 9/1966 Embree ........................ 340/15.5(C)
3,284,763 11/1966 Burg et al. ................... 340/15.5(C)

Primary Examiner—Richard A. Farley
Assistant Examiner—Daniel C. Kaufman
Attorneys—Joseph C. Kotarski, Henry H. Huth, Jerry B. Peterson and William J. Miller ABSTRACT: Multitrace seismic data is analog velocity filtered to reject signals arriving at the detector array along undesired apparent velocity paths. The detected seismic signals are recorded on a magnetic medium and read out by means of two oppositely polarized read heads whose outputs are combined and applied to an attenuator and the resultant signals are thereafter summed. The read head spacing and signal attenuation are set in accordance with the spacing of the corresponding detector from the array center. Thus each trace is convolved with a two point operator which is dependent on detector offset. The summation signal includes only events which appear at the detector array along apparent velocity paths greater than a preselected value. The preselected value may be adjusted by varying the speed of the record medium.

PATENTED APR 27 1971 3,576,522

INVENTORS.
WILLIAM E. N. DOTY,
DONALD E. DUNSTER &
DOUGLAS S. SULLIVAN
BY
William J. Miller
ATTORNEY

Fig. 6

METHOD AND APPARATUS FOR ANALOG VELOCITY FILTERING

This invention relates to improvements in the art of geophysical prospecting and, more particularly, but not by way of limitation, to a method and apparatus for performing analog, wide-band velocity filtering on multitrace seismic signal returns as derived from a seismic detector array.

Velocity filtering is recognized as a valuable tool in the interpretation of seismic records. Its use enables very effective cancellation of great diminution of much undesired seismic signal return which appears on seismic records due to random noise, high velocity noise, ground roll, certain organized multiples and dipping events, etc. The concept of velocity filtering in itself is now new; however, the present method and apparatus enables analog velocity filtering in the field upon direct receipt of the seismic signals from a detector array or, alternatively, the analog velocity filtering of previously recorded signals at a central processing laboratory.

The present invention contemplates a method and apparatus for analog velocity filtering whereby the seismic signals received by the individual units of a detector array are transformed and attenuated in accordance with a predetermined two-point operator to obtain the maximum rejection of seismic signals arriving at the detector array along undesired apparent velocity paths. More particularly, the invention contemplates the imposition of a predetermined transfer function in the form of a two-point operator upon each seismic trace detected by a detector array in order to effect a predetermined frequency distortion and signal attenuation in accordance with the offset and distance at which the particular seismic traces are detected from the center of the array; thereafter, a final summation of all traces will indicate only those seismic events which appear at the detector array along apparent velocity paths greater than a preselected value.

The method is carried out by means of analog equipment which processes the seismic traces at their proper space-frequency operation function so that, effectively, a predetermined weighting of the detector array is apparent for a plurality of frequency bands within the useable range of seismic signal frequencies. In particular, the function may be fulfilled by reading out each recorded seismic trace by means of two magnetic heads which are oppositely polarized and displaced in time by a predetermined increment, such increment being determined in accordance with the distance at which the seismic trace is detected from the detector array center. Each trace signal is then attenuated, also in accordance with trace spacing from the center of the detector array, and a summation of the traces results in a velocity filtered trace for that particular seismic record or family of traces. Adjustment of the desired apparent velocity cutoff limit may be effected either by predetermined spacing of magnetic head pairs or by varying the initial recording time of the seismic trace information relative to actual field time such that the apparent velocities are varied accordingly.

Therefore, it is an object of the present invention to provide a method and apparatus for performing wide-band velocity filtering whereby the detector array is effectively weighted by means of an analog operation upon the detected seismic traces to present optimum half-wavelength cancellation characteristics for each frequency of seismic signal within a desired range.

Further, it is an object of this invention to provide a method and apparatus whereby velocity filtering of seismic traces can be carried out within preselected velocity exclusion limits by means of analog equipment, and the seismic traces may be filtered either directly upon detection in the field, or in the laboratory upon later playback of recorded seismic information.

It is still further an object of the present invention to provide analog processing equipment for operating on a given seismic trace in accordance with a predetermined transfer function such that a summation of all traces provides a selected, optimum signal rejection for a plurality of frequency bands within a desired range.

Finally, it is an object of the invention to provide analog read out of seismic trace information in accordance with two-point operator functions which equate to predetermined space-frequency operators to induce optimum frequency and amplitude distortions such that a summation of all trace functions results in the exclusion of seismic events detected along all but predetermined velocity paths.

Other objects and advantages of the invention will be evident from the following detailed description when read in conjunction with the accompanying drawings which illustrate the invention.

A general treatment of the subject of velocity filtering is included hereafter to clarify as to the velocity concepts referred to and treated herein. The term "velocity" used in this regard refers to the apparent velocity with which a given signal arrives at the individual units of a detection array. For example, it should be apparent that more horizontally traveling signals will reach the closest seismometer unit of an in-line detection array appreciably before it reaches the more remote seismometer and, by the same token, a seismic signal reflected from a very deep strata will reach the individual seismometers of the detection array at almost the same time. Hence, a rate of signal travel can be derived relative to the detection array itself.

The apparent velocity concept has been utilized for a considerable time in the design of common array type filters for cancelling certain dipping events, low velocity noise, and certain other forms of interference which appear on multitrace seismic records. In these previous uses, the apparent velocity concept could only be used for cancellation at specific frequencies of signal return as instrumented by particular half-wavelength spacing of the individual detector units in a detection array. However, in implementing the velocity filter it is necessary to have the equivalent of very many different detection array spacings, one for each frequency to be encountered in that portion of seismic return which it is desirable to cancel out.

The present method and apparatus is concerned with the utilization of a two-point operator for application in the velocity filtering of multiple traces of seismic information. The two-point operator enables the synthesis of different frequency distortions for a multiple of different detector offsets along the detection array such that the summation of the plurality of frequency distorted traces for the different offsets has the effect of different weighted arrays for the different frequency bands under consideration. Each trace or seismic return signal is convolved upon itself as a function of a two-point operator which has predetermined characteristics in accordance with the distance from which the signal was detected from the center of the detection array. This convolution effects an optimum frequency distortion of the trace. The convolution by itself is in no way any type of velocity filter; however, the individual convolved traces are then attenuated, also in accordance with their spacing from the center of the detection array, and a subsequent summation of the traces results in the velocity filtering or cancellation of undesired coherent events.

Figure 1:
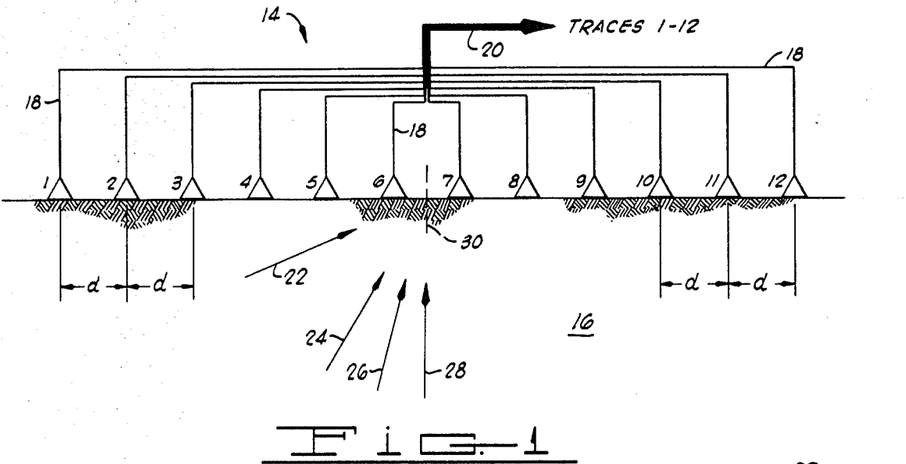
FIG. 1 is a pictorial cross section of a detector array located on the earth with exemplary seismic signal paths indicated.

FIG. 1 shows a detector array 14 comprised of individual seismometers or detector units Nos. 1 through 12 positioned in linear array on the earth 16. Each of the detector units Nos. 1—12 conducts returned seismic signal indications on leads 18 to a suitable cable 20 for delivery to recording or further processing equipment. The detector array 14 is merely exemplary as to the number of individual detector units and, in some cases, the individual detector units (Nos. 1 through 12) might be replaced by individual detector subarrays to enable further interference reduction.

The arrows 22, 24, 26 and 28 denote exemplary seismic signal paths which may be received into the detector array 14. Seismic waves arriving generally along path 22 might result from ground roll and other near-surface interference patterns. The waves arriving along path 22 would be said to have a very low apparent velocity; that is, the waves would be detected by the No. 1 detector a relatively long time before their detection at the No. 12 detector. Waves arriving on path 24 would be reflected or refracted from interfaces at a somewhat deeper level and these waves would have a comparably greater apparent velocity since the detection time difference between detectors No. 1 and No. 12 would be somewhat less. Similarly, waves arriving on path 26 from a still deeper reflecting or refracting event would have a still greater apparent velocity through having a further reduced time of detection between adjacent detector units. A seismic reflection from a very deep event might approach the detector array 14 along the path of arrow 28, perpendicular to the line of the detector array, so as to indicate an apparent velocity approaching infinitely high speed.

The velocity filter depends upon these apparent velocities or signal speeds relative to the detection array 14 for its effectiveness. That is, by placing a predetermined spacing $d$ between individual detector units and, therefore, making finite and constant the offset or point of detection of each trace from the center 30 of detector array 14, predetermined trace weighting and summation can be effected to eliminate signals arriving along undesired velocity paths. For example, taking a single undesired velocity path 22 (FIG. 1), signals will be detected successively as they arrive at detector unit No. 1, No. 2, etc. ... to No. 12 and these detected signals will be in varying phase relationship depending upon the actual frequency of that seismic signal arriving along path 22. By weighting and attenuating the received traces in a predetermined manner (by means of the proper two-point operators to be fully described) the summation of all trace signals can effect half-wavelength cancellation of certain signals detected along that velocity path 22. Further, the spacing and offset of the array 14 and the selection of two-point operators can be done in such a manner that a majority of signals of all frequencies present along the velocity (apparent velocity) path 22 will be cancelled or greatly diminished.

It is the aim of velocity filtering to so choose the detector spacing $d$, the number of detectors and, therefore, the length of array, and the transfer and attenuation functions of received traces such that all received signals below a predetermined cutoff velocity $V_o$ are rejected from the final summation trace. The cutoff velocity, an apparent velocity limit derived from knowledge of the terrain or previous inspection of the seismic traces, can be preselected by choice of the particular operator functions as will be further described.

The velocity filtered or summation trace derived from the process is a single trace indicative of signal detection at the center of detection array 14. That is, when 12 detected signals are summed, the time indication of the resulting velocity filtered pulses will be equivalent to the time of a trace 6½ or the midpoint of a 12 trace detection pattern. Thus, the velocity filtered trace merely shows the presence of a valid event above a predetermined apparent velocity (below a predetermined depth of return) and is not in itself an interpretable pattern. However, the operator or interpreter can establish the validity of an event and can then proceed to stack or add additional velocity filtered traces to determine any step-out or other pattern of interest.

Figure 2:
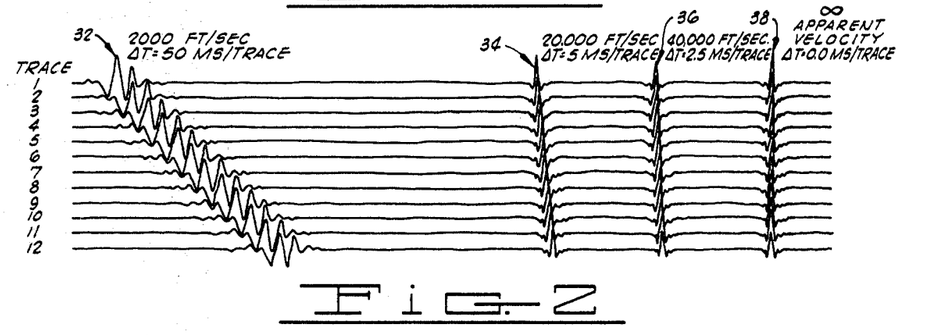
FIG. 2 is a 12 trace seismic record in ideal form showing selected events of different apparent velocities.

FIG. 2 shows a 12 trace seismic record, idealized in form, which shows the ground roll or surface wave event 32 and a series of events 34, 36 and 38 which might, for example, have arrived along the respective velocity paths 22, 24, 26 and 28 of FIG. 1. The increase in apparent velocities of events 32, 34, 36 and 38 is apparent in the increase of their respective slopes to the transverse of the 12 trace seismogram. It should be understood that a vibrational type of seismic record would be similarly represented by each of the pulses shown here plus their respective trailing signals in accordance with the particular vibrational input series. In any event, the time relationships or order of occurrence would be identical.

Assuming that the 12 trace seismogram of FIG. 2 is taken from the detection array 14 (FIG. 1) wherein the distance $d$ between adjacent, linearly aligned detector units Nos. 1—12 is 100 ft., the apparent velocities can be determined from inspection of the seismogram. Thus, with the low velocity waves of group 32, it might be determined from the seismogram that the signals are displaced 50 milliseconds per trace (any two adjacent traces). By then inserting values in the equation $$V_a = \frac{d}{\Delta t}$$

the apparent velocity $V_a$ of 2,000 ft. per second can be derived. In the same manner, the events of group 34 can be determined to be at an apparent velocity $V_a$ of 20,000 ft. per second since like components of energy traverse any two adjacent seismometers which are spaced 100 ft. apart in the trace displacement interval or $\Delta t$ per trace of 5 milliseconds per trace. The similar computation can be made with respect to events 36 and 38, which exhibit increasing apparent velocities as indicated by the respectively decreasing trace intervals or $\Delta t$ per trace values.

The multitrace seismic record of FIG. 2 is, of course, idealized and a usual field record is thoroughly masked over with random signals (noise, etc.) which render valid events difficult of determination. Thus, the use of velocity filtering will allow cancellation of all random signals as well as the cancellation of all ordered events which have apparent velocities $V_a$ below a preselected limit which defines the cutoff velocity $V_o$. That is, if a suitable velocity filter were applied which had a cutoff velocity $V_o$ setting or $\Delta t$ per trace of plus or minus 2 ms. per trace, then all ordered events having a lesser apparent velocity $V_a$ (greater $\Delta t$ per trace) would be cancelled out and only those events within the desired velocity passband would be passed or applied to the final velocity trace.

Figure 3A:
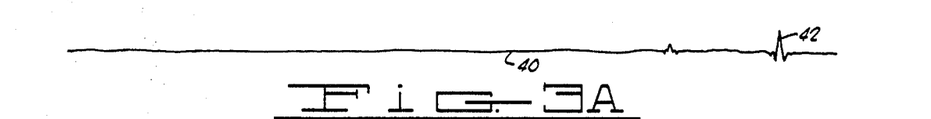
FIGS. 3A, 3B and 3C show velocity trace records which may result from velocity filterings of the FIG. 2 record at different, selected velocity cutoff limits.

FIG. 3A shows a velocity filtered trace as derived from the multitrace recording of FIG. 2 with the application of a velocity filter having a 2 ms. per trace ($\Delta t$) cutoff velocity. The trace 40 indicates the passage of only the pulse 42 which is indicative of a trace No. 6½ of the group of events 38 having a $\Delta t$ of 0, the apparent velocity (infinite) exceeding that of the preset cutoff velocity. Remaining random signals as well as lower velocity signals having $\Delta t$ values greater than 2 ms. per trace are completely cancelled out or greatly diminished.

Figure 3B:
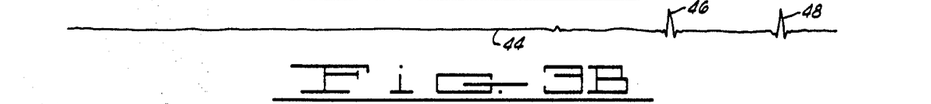
Figure 3C:
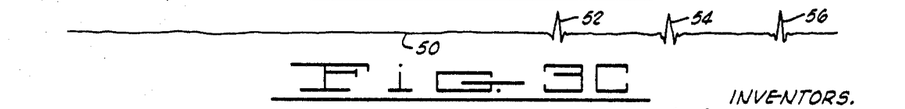

In FIG. 3B, a velocity trace 44 is shown as it would be taken with a velocity filter having a wider spread of cutoff velocity or a $\Delta t$ of 3 ms. per trace. Hence, the pulses 46 and 48 indicate the presence of valid events, the signal groups 36 and 38 of FIG. 2. Likewise, a trace 50 of FIG. 3C, taken with a velocity filter having a velocity cut or $\Delta t$ value of 6 ms. per trace, indicates pulses 52, 54 and 56 representative of valid event groups 44, 46 and 48 of FIG. 2 which have apparent velocities or $\Delta t$ values of 5, 2.5 and 0 ms. per trace, respectively.

Velocity filtering utilizes the concept of an apparent velocity and requires two dimensions for its characterization. Filtering may be carried out utilizing an operator in the space-time domain $$V = \frac{d}{t}$$

where V equals velocity and $d$ equals the spacing between adjacent seismometers in the detector array; or, in the space-frequency domain $$V = f\lambda,$$

where $f$ equals frequency and $\lambda$ equals wavelength; or, by using the wave number and frequency relationship where $$V = \frac{f}{k}$$

$k$ representing the wave number or reciprocal of wavelength.

For present purposes, the space-frequency operator will be treated in order to synthesize a suitable two-point operator for employ in the analog velocity filtering process. The design equation $$G(X, f) = \int_{-\frac{|f|}{V_o}}^{\frac{|f|}{V_o}} e^{-2\pi i k X} \, dk \quad (1)$$

is one which is generally recognized in the art as being representative of the space-frequency operator, G (X, $f$), where $V_o$ is the lower limit or cutoff velocity, $f$ absolute represents the maximum frequency to be encountered, X is equal to the distance along the array profile or the detection offset from the center of the array, and $k$ is representative of wave-number, a reciprocal of frequency wavelength. The space-frequency operator G (X,$f$) in equation (1) above can then be integrated to yield $$G(X, f) = \frac{\sin 2\pi x \frac{|f|}{V_o}}{\pi x} \quad (2)$$

and whenever a predetermined cutoff velocity $V_o$ is selected the equation (2) becomes $$G(X, f) = \frac{\sin 2\pi c f X}{\pi x} \quad (3)$$

where the cutoff velocity $V_o$ becomes constant $c$ for each frequency $f$ and offset distance or array spacing X which occurs in the range of consideration.

Figure 4:
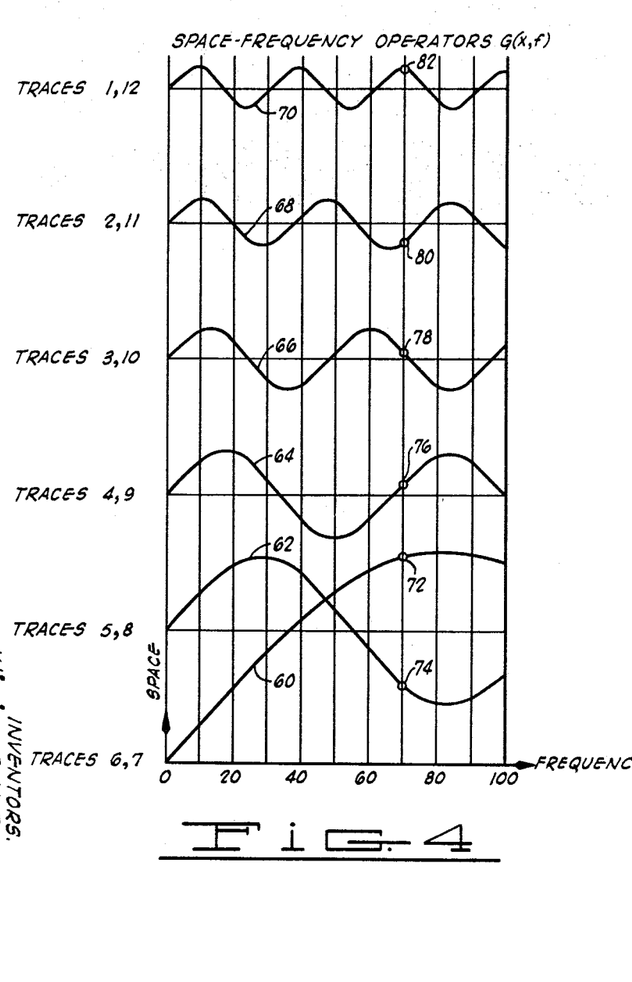
FIG. 4 shows the space-frequency operators for a 12 trace record having an exemplary velocity cutoff value chosen at 6 milliseconds per trace.

FIG. 4 shows a plot of the space-frequency operator G (X,$f$) for an apparent velocity cutoff ($\Delta t$ per trace) of 6 ms. per trace. The abscissae are graduated in frequency from 0 to 100 cycles per second which includes the usual range of useable seismic energy output as well as the generally employed frequency ranges of vibrational seismic energy output. That is, the vibrational transducer is preferably operated through either an upsweep or downsweep between, for example, 10 and 90 cycles per second. The ordinate of FIG. 4 represents relative trace weight factors at different offsets X of the detector array. The velocity filter employs weighting of the detector array relative to a center point, for example, midway between trace 6 and trace 7 for a 12 trace seismogram. A 12 trace seismogram (as shown in FIG. 2) is employed for purposes of illustration but it should be understood that any number of traces or signal channels could be used to compile a velocity filtered trace. However, it can be generally stated that the more traces employed, the greater the cancellation of random components in the traces.

Thus, in FIG. 4, for the middle two of 12 traces, traces 6 and 7, the space frequency operator is shown by the line 60, gradually increasing from 0 cycles per second to a high value at the higher frequencies. This operator or spectrum curve 70 indicates the weight which must be accorded the center traces 6 and 7 at the respective frequencies of the received seismic signals. Trace 62 shows the operator or spectrum curve of weights for the next adjacent outward traces 5 and 8. It can be noted that the operator 64 is increased in frequency and attenuated in amplitude. Similarly, the operator or weight traces 64, 66, 68 and 70, for the increasingly more outward trace pairs 4 and 9, 3 and 10, 2 and 11, and, finally, 1 and 12, each show an increase in frequency and a reduced amplitude as the operator analysis moves to the successively more outward trace pairs.

The weighting of the respective traces in accordance with a space-frequency operator enables better attenuation of undesired events since each of the traces is frequency distorted differently according to its respective offset (from the center of the array), and the resulting distorted traces can then be summed to derive only the seismic events within the velocity passband. That is, the distortions of the events within the velocity passband are corrected in the addition of frequency distorted traces while events falling outside the velocity passband are more optimally rejected than would be possible with just a straight addition of the original traces wherein no frequency distortion was interjected. It should be noted here that the exemplary operators of FIG. 4 only hold true for a $\Delta t$ or velocity cutoff of 6 ms. per trace, the frequencies of the respective operators (weight spectra) decreasing ratably with a decrease in the $\Delta t$ of the filtering system. For example, at $\Delta t$ of 2 ms. per trace, the operator frequencies are one-third of those depicted in FIG. 4.

Figure 5:
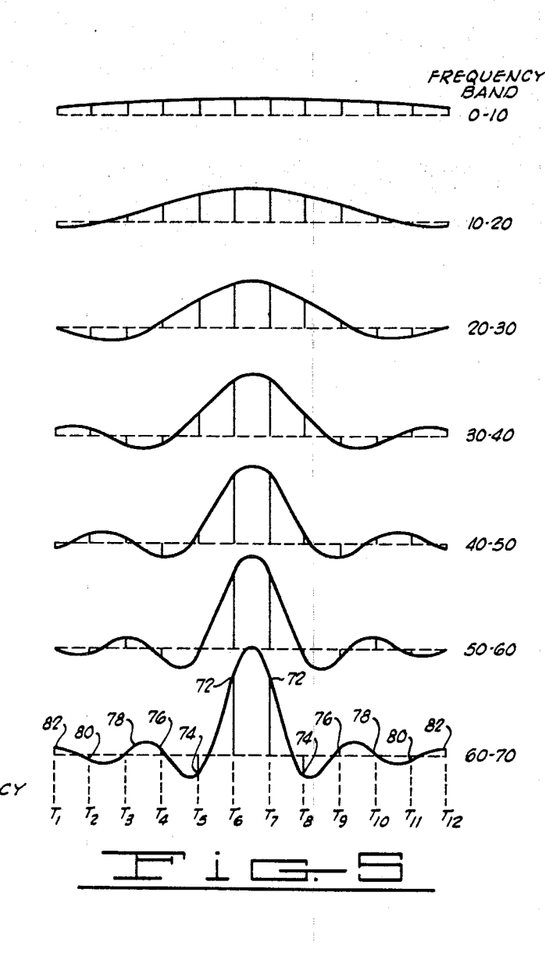
FIG. 5 shows the effective weighted array for different frequency bands as can be plotted from the space-frequency operators of FIG. 4.

FIG. 5 shows the effective array weighting for selected frequency bands between 0 and 70 cycles per second which results when the weights of the FIG. 4 operator functions are applied to the respective trace signals. That is, the processing of the multitrace seismic signals with the space-frequency operators is the equivalent of the institution of detector array weighting as shown in FIG. 5. FIG. 5 shows a series of 10 cycle frequency bands each represented by its respective weighting factor as it would occur across the plural detectors of the detector array, i.e., traces 1 through 12 of the seismogram under consideration.

The relative amount of the weights from the center of the array to either end can be determined from the space-frequency plot (FIG. 4) by traversing vertically along the desired frequency ordinate. For example, the 60 to 70 cycles per second weighting curve of FIG. 5 could be determined by inspection of FIG. 4 as follows. The trace 6 and 7 weights (central detectors No. 6 and 7 of a 12 detector array) would be represented by a point 72 on curve 60 (FIG. 4) at the 70 cycle per second ordinate. Similarly, the traces 5 and 8 would be weighted in accordance with the relative value of point 74 while the points 76, 78, 80 and 82 would yield the proper weighting values for traces 4 and 9, 3 and 10, 2 and 11 and the outer traces 1 and 12. Thus, moving vertically on the space-frequency plot determines, for a particular frequency, the relative weights given that frequency for different offsets across the detector array. Therefore, in summing the traces which have been distorted differently for different offsets X, it is possible to obtain a differently weighted detector array for each different incoming frequency of seismic signal.

Referring again to equation (2), it was shown that if a particular cutoff velocity $V_o$ is chosen, the equation becomes $$G(X, f) = \frac{\sin 2\pi c f x}{\pi X} \quad (3)$$

wherein $V_o$ is equal to the constant $c$. Then, for a particular detector offset, X is constant and the equation becomes $$G(X, f) = \frac{\sin c_1 f}{c_2}$$

In other words, a trace which would originate from the particular offset X would be operated on by this function. Thus, the above equation satisfies the velocity filter for the particular offset X from the center of the nest; however, a plurality of offsets are needed collectively to satisfy the total velocity filtering function.

Since the spacing $d$ is known for the distance between adjacent detectors in the linear detector array, the offset distance X from the center of the array can be shown for each one of the similar trace pairs. That is, trace pairs which are equally spaced on opposite sides from the detector array center point. Thus, for the innermost traces 6 and 7, the offset distance would be equal to $d/2$. Similarly, the traces 5 and 8 have an offset X which is equal to $3d/2$. A tabulation of the offsets and attendant space-frequency operators is as follows:

| Detector position | Offset | $G(X,f)$ |
|---|---|---|
| Traces 6, 7 | $X=\frac{d}{2}$ | $\sin\frac{c_1 f}{c_2}$ |
| Traces 5, 8 | $X=\frac{3d}{2}$ | $\sin\frac{3c_1 f}{3c_2}$ |
| Traces 4, 9 | $X=\frac{5d}{2}$ | $\sin\frac{5c_1 f}{5c_2}$ |
| Traces 3, 10 | $X=\frac{7d}{2}$ | $\sin\frac{7c_1 f}{7c_2}$ |
| Traces 2, 11 | $X=\frac{9d}{2}$ | $\sin\frac{9c_1 f}{9c_2}$ |
| Traces 1, 12 | $X=\frac{11d}{2}$ | $\sin\frac{11c_1 f}{11c_2}$ |

In the above operators, $c_1$ equals $2\pi c X$ and $c_2$ equals $\pi X$.

Thus, it can be seen from the above functions that each of the operators adheres to the conventional $\sin y/y$ function for a given frequency, the only variations being as to the detector spacing (offset X) which alters both the amplitude and the period of the respective pairs of space-frequency operators. The particular function can be generated in several ways using analog equipment as will be further described.

Figure 6:
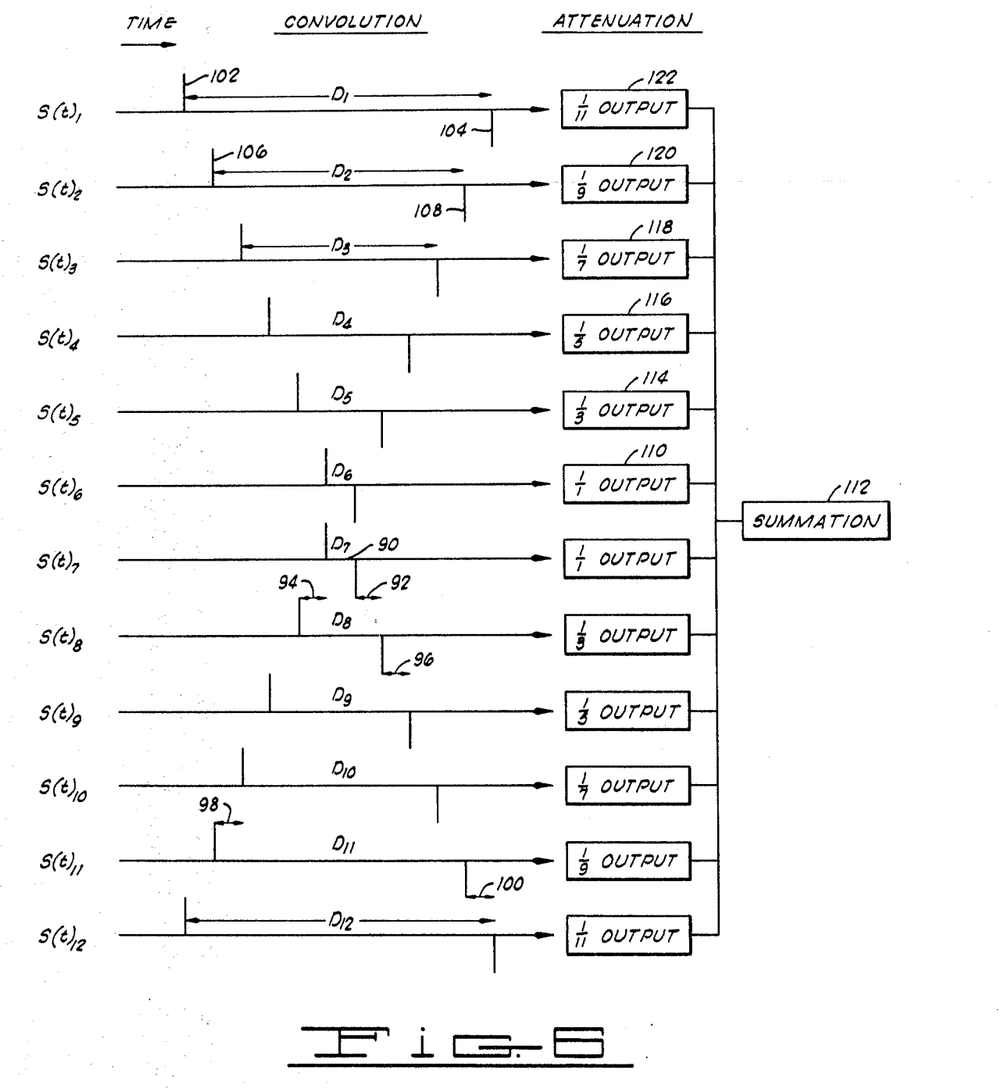
FIG. 6 is a function diagram illustrating the time and phase relationships of exemplary two-point operator functions for each trace of a 12 trace record.

Fig. 6 illustrates a time representation of an exemplary set of two-point operators applied to a family of seismic trades $S(t)_1$ through $S(t)_{12}$ in accordance with the present invention. In FIG. 6 each of the seismic traces $S(t)_1$ through $S(t)_{12}$ is shown as a linear time representation with its respective sine function represented as a two-point operator in time. Such representation is the equivalent of a continuous convolution of each seismic trace upon a phase reversed, time delayed replica of itself. Each of the two-point operators is represented as a positive and a negative sampling spaced apart by a time which is determined by considerations of the particular trace offset X; those trace pairs which are opposite but equally displaced from the array center will have similar operators.

For example, it will be assumed that the space-frequency operators of FIG. 6 are adjusted for a 6 ms. per trace cutoff velocity $V_o$. Thus, for traces Nos. 6 and 7 the point spacings $D_6$ and $D_7$ would each span 6 ms. of field record time. Proceeding from seismic trace $S(t)_7$ to $S(t)_{12}$ (outward from the center of the detector array) the respective operator intervals $D_8$ through $D_{12}$ would have a progressive 6 ms. increase in both advance and delay. Hence, each of the operator point spacings would show an increase of 12 ms. over the next more inward operator spacing. That is, the $D_7$ interval 90 would be equal to 6 ms. and the operator point shifts 92 and 94 would each be 6 ms. and so on down the line as exemplified by the arrows 96, 98 and 100. Similarly, the operator point shifts for the two-point operators of $S(t)_6$ through $S(t)_1$ would have similar successive time shifts for the preselected cutoff velocity of 6 ms. per trace.

The depicted two-point operators show a time schedule of convolution of each of the seismic traces $S(t)_1$ through $S(t)_{12}$. It would be sampled at a first point in time, shown by the operator line 102, and thereafter convolved with the same trace as taken at a later point of time, shown by the operator line 104, displaced a duration $D_1$. Since the operator samples 102 and 104 are taken in phase opposition the sine function of the design equation is fulfilled and the delay time $D_1$ is proper for the particular outer trace of the 12 trace seismic record. Similarly, the trace $S(t)_2$ convolves trace information of opposite polarity at operator points 106 and 108 displaced in time by a duration $D_2$. Thus, each trace is convolved upon itself at a time relationship as depicted in FIG. 6 to impart the necessary frequency distortion to the individual traces such that seismic signals arriving within the velocity cut range can be preserved to the exclusion of all others. In accordance with the offset distances of the individual traces, the delays $D_1$, $D_2$, $D_3$, $D_4$, $D_5$ and $D_6$ will have respective time displacement ratios of 11, 9, 7, 5, 3 and 1 in accordance with the previously listed operator equations for particular offsets. As depicted, the traces $S(t)_7$ through $S(t)_{12}$ will have similar operator displacement ratios.

After the convolution of each seismic trace in accordance with its respective oppositely phased operators, the traces are then attenuated in accordance with the amplitude limit of the respective operator equations. Thus, as per the amplitude factor in each of the equations, the signals are attenuated by an amount equal to the reciprocal of $2n-1$, $n$ being the trace order progressing from the center traces outward. Thus, the center trace $S(t)_6$ receives no attenuation and provides a unity output 110 to a suitable summation procedure 112. The next more outer trace $S(t)_5$ ($n=2$) receives an attenuation to provide a ⅓ output 114 and similar attenuation stages 116, 118, 120 and 122 provide decreasing signal at 1/5, 1/7, 1/9 and 1/11 output as the seismic traces progress to the more outer positions of the detector array. The similar attenuation at a ratio of $2n-1$, where $n$ is the order number of the trace from the array center, will hold true for the traces $S(t)_7$ through $S(t)_{12}$.

The convolution of seismic traces at selected operator periods provides analog signal processing at the proper sine function and period and, thereafter, the attenuation phase of the process adjusts the amplitude of the individual seismic traces; the combined operation serving to properly weight the trace signals in accordance with their position in the detector array. Thereafter, a summation (stage 112) of each of the plurality of seismic traces as derived after transformation with the proper space-frequency operator will yield the desired velocity filtered trace. All events occurring or detected by the detector array at an apparent velocity greater than the selected cutoff velocity $V_o$ will appear on the velocity trace and all other interference and lesser velocity events will be eliminated or greatly reduced. It should be reiterated that the step of convolution and attenuation does not, in itself, provide the velocity filter effect. The transfer function imposed by the two-point operator merely distorts the respective traces in an optimum manner so that the succeeding summation of all traces will result in the velocity filtered trace.

One method of generating the particular space-frequency operators utilizing the two-point convolution is by the use of magnetic heads. If two magnetic heads are displaced in time and one is wired 180° out of phase with the other, the basic space-frequency operator equation can be satisfied.

Figures 7, 8:
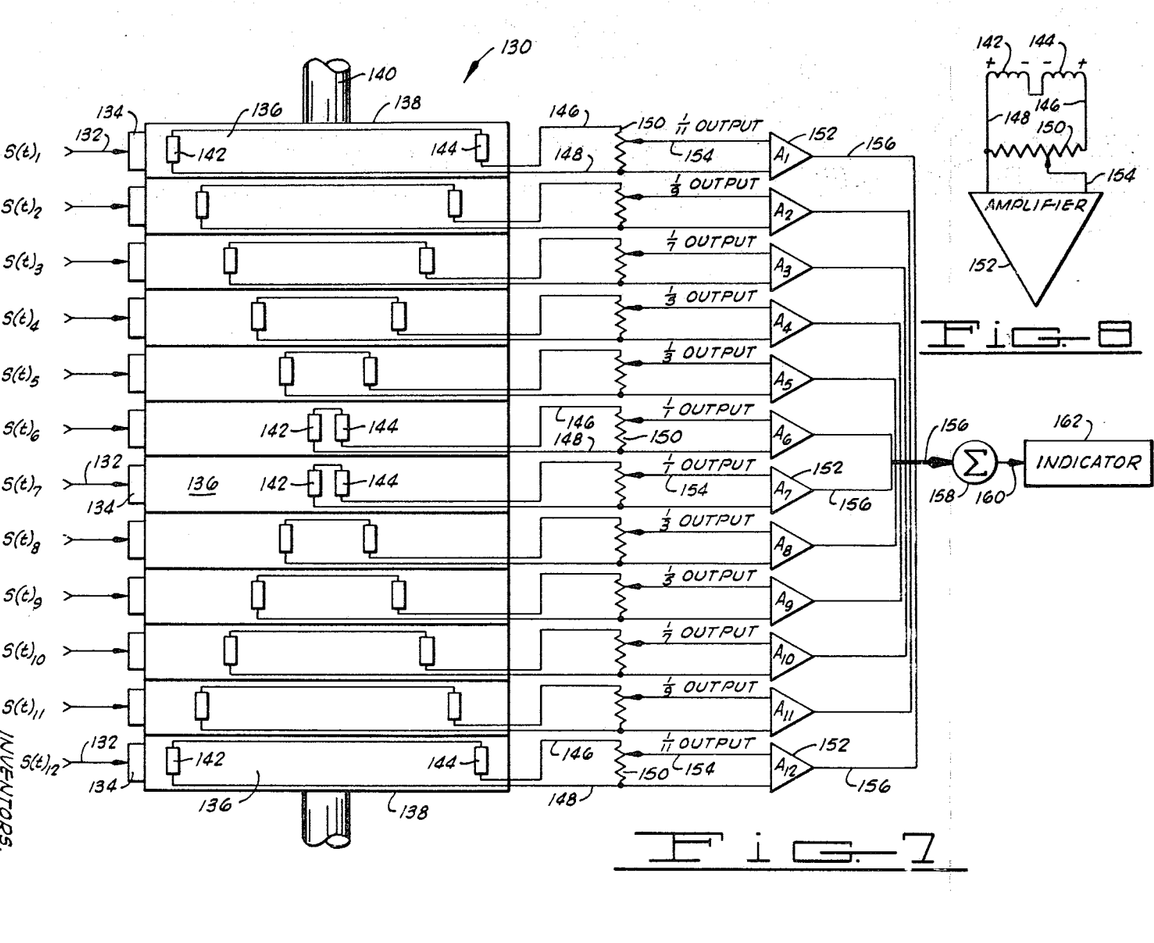
FIG. 7 is one form of analog apparatus which may be employed to velocity filter in accordance with the method of the invention.
FIG. 8 is a partial schematic drawing illustrating the wiring interconnection of magnetic heads and an attendant attenuator network.

FIG. 7 illustrates one form of velocity filtering apparatus 130 wherein the operator transfer functions are imposed by means of phase-opposed magnetic heads. Each of the family of seismic traces $S(t)_1$ through $S(t)_{12}$ are applied through parallel leads 132 to respective record heads 134. The seismic traces may originate from detectors placed in the field or from previously recorded seismic information. Each of the record heads 134 is aligned for recording on a channel 136 of a suitable recording drum 138. The recording drum 138 may be a conventional type, such as the Techno recording drum (Techno Instruments Corporation), which provides a plurality of continuous magnetic recording tracks or channels 136 about its circumference. The present illustration shows 12 channels 136 receiving seismic trace information from each of the recording heads 134. The recorder drum 138 is driven by conventional recorder drive means (not shown), rotational drive being applied on a shaft 140.

A magnetic head 142 and an oppositely connected magnetic head 144 are positioned for readout of seismic information from each record channel 136. Each pair of record heads 142 and 144 are positioned in a time displacement consonant with a two-point operator which is applicable to the particular channel or seismic information. As illustrated in the drawing (FIG. 7), the time displacement is made relative to the center traces, $S(t)_6$ and $S(t)_7$. Taking again, for example, the case of a velocity filter having a cutoff velocity of 6 ms. per trace, the placement of respective pickup heads 142 and 144 for each channel will be similar in configuration to those operator points shown in Fig. 6. That is, for the center traces $S(t)_6$ and $S(t)_7$ the time displacement of heads 142 and 144 will be 6 ms. Proceeding outwardly then, each pair of magnetic heads 142 and 144 will be further displaced (oppositely) in time by the $V_o$ factor of 6 ms. per trace. That is, each magnetic head 142 will succeed its more inward channel head 142 by 6 ms. per trace and each magnetic head 144 will precede the next more inward magnetic head 144, the precessions and successions being with respect to the actual field time of the seismic trace signal as it appears on the recording channels 136.

The above description pertaining to a velocity filter having a $V_o$ of 6 ms. per trace would provide convolution of each of the seismic traces with its respective operator transfer function. The schematic drawing of FIG. 8 illustrates the manner in which the magnetic heads are wired. The leading and trailing (as to physical location) magnetic heads 142 and 144 are connected in phase opposition to provide an output signal on leads 146 and 148 to an attenuator 150 and amplifier 152 as will be further described. The support and positioning mechanism for maintaining the magnetic heads 142 and 144 in their predetermined readout relationship is preferably of an individually adjustable type which is commonly used in the art. Such well-known equipment allows adjustment of the magnetic heads 142 and 144 for a particular cutoff velocity $V_o$. A $V_o$ of 6 ms. per trace has been selected for this example, however, depending upon the data, terrain and other operational factors, it may be desirable to employ a wider or narrower velocity passband. For example, in the event that a 2 ms. per trace $V_o$ was desired, the time displacement of respective magnetic heads 142, from the inner traces proceeding outwardly, would only be 2 ms. per trace; and similarly, the magnetic heads 144 would be oppositely displaced at progressive 2 ms. intervals.

The output from the oppositely connected magnetic heads 142 and 144 of each of the 12 signal trace channels is provided on leads 146 and 148 to a suitable attenuator, shown here as a potentiometer 150. The attenuators 150 are each adjusted to provide an output in accordance with the operator function applicable to the particular seismic trace channel. That is, full weight or unity output is provided for the center two traces $S(t)_6$ and $S(t)_7$ while the more outward attenuator factors are increased to provide decreasing outputs as a function of the reciprocal of $2n-1$, $n$ being the trace order from the center of the family of seismic traces. Thus, proceeding outwardly from trace $S(t)_6$ to $S(t)_1$, respective weighted output signals from potentiometers 150 would be unity, ⅓, 1/5, 1/7, 1/9 and 1/11 output and a similar output ratio would apply from central trace $S(t)_7$ outwardly to trace $S(t)_{12}$.

The selected output signals from potentiometers 150 are then conducted via lead 154 to a respective amplifier 152. The amplifiers 152 may be a conventional type of seismic signal amplifier as is commonly employed in the geophysical information processing art. Such amplifiers have the characteristics of high gain and accurate calibration consistent with the exactness of the process. The individual outputs from each of the amplifiers 152 is provided on parallel leads 156 to a summation network 158. The summation network 158 may be any suitable type such as the commonly employed resistor network.

The summation network 158 accepts each of the individual seismic trace signals as it has been frequency distorted by convolution and attenuation in accordance with its space-frequency operator to provide a summation output on lead 160 to a suitable indicator 162. The indicator 162 may be an oscilloscope, magnetic recorder or other reproducing means for storing or making visible the velocity representation. The actual velocity indication, or pulse reproduced by indicator 162 for a valid trace event within the velocity passband, will actually have a seismic record time position which would be equivalent to a trace 6½ relative to the original 12 seismic traces, $S(t)_1-S(t)_{12}$. Also, due to the inherent phase shift of detected seismic energy, the obtaining of precise field time would require that a 90° phase shift be put in the individual operators for the two head method to be proper; however, this 90° can be put in the detector array parts before velocity filter, by well-known means, or it can be put in the trace after velocity filtering. In many cases, it is not even required since the seismic data interpretation will deal mainly with relative time values between particular events rather than a precise indication of actual field time.

In the operation of the FIG. 7 apparatus, preadjustment features are attended to by the operator in accordance with the characteristics of the particular seismic record (trace family) and the seismic information desired. Thus, the input seismic traces $S(t)_1$ through $S(t)_{12}$ may be taken directly from a field detector array wherein terrain and other earth characteristics are known, or the input signals may be played back from a previously recorded multitrace seismic record where the velocity cut for desired events has been previously ascertained by interpretative processes. The operator adjusts each of the magnetic heads 142 and 144 for the respective 12 recording channels 136 at its proper time displacement. This is adjusted in balanced fashion from the center traces outward such that traces $S(t)_6$ and $S(t)_7$ have their respective heads 142 and 144 closely spaced at the selected $\Delta t$ per trace interval, and the magnetic heads 142 and 144 of more outwardly displaced traces are successively increased in spacing by the $\Delta t$ increments as illustrated in FIG. 6. The selected $\Delta t$ per trace will establish the desired velocity passband or velocity cut $V_o$.

The attenuators 150 are adjusted to provide a decreasing output by the reciprocal of $1/2n$—progressing from the center traces outward where $n$ is the number of the trace from the center. This should be a fairly constant adjustment needing but occasional check of the calibration. The procedure is then begun by connecting the seismic trace information through the recorder heads 134 to the respective channels 136 of recorder drum 138. Each of the channel signals $S(t)_1$ through $S(t)_{12}$ is picked up by a preceding (field signal time) head 144 and convolved with trace information of opposite polarity picked up by the respective trailing head 142. The displacement of the plurality of magnetic heads 142 and 144 is in accordance with the space-frequency operator applicable for each of the multiple channels of seismic trace information.

The individual channels of information are then conducted on leads 146 and 148 to respective attenuators 150 which are set for attenuating the outputs as illustrated, giving unity weight to the central traces and decreasing weight to the more outward seismic traces. The convolved and attenuated seismic traces are then applied to respective amplifiers 152 whereupon the individual outputs are summed in a summation network 158. The summed trace value output on lead 160 then represents the velocity filtered signal which can be suitably displayed or stored at the indicator 162 as the final velocity trace representation.

In the event of a seismic record of the vibrational survey type, correlation procedure must be instituted to derive a meaningful velocity trace. The correlation procedure, now well known in the art, can be instituted either before or after application to the velocity filtering device. Such correlation procedure and apparatus is the particular subject matter of U.S. Pat. No. 2,989,726 entitled "Method of and Apparatus for Determining the Travel Time of A Vibratory Signal Between Spaced Points" in the name of Crawford et al. and assigned to the present assignee.

In most cases the indicator 162 will probably take the form of an additional multichannel recorder to aid in the carrying out of velocity filter procedures which are more commonly employed. For example, it is often desired to process a large number or series of related multitrace seismic records with the velocity filter and to thereafter stack the respective velocity filtered traces to give a more meaningful profile or interpretative pattern. Thus, it may be desirable that the indicator 162 would have the capability of receiving successive velocity filtered traces in a similar time relationship to record them in adjacent traces.

While the pickup heads 142 and 144 may be positioned for proper operation convolution by means of adjusting mechanism which is adjunct to the commercially available recording equipments, it is anticipated that it will be preferable to employ a suitable ganged mechanical adjustment means whereby a cutoff velocity $V_o$ can be effected by positioning each of the plurality of pickup heads 142 and 144 by a single manipulation. This adjustment could, of course, be calibrated to provide a dial indication of the cut velocity $V_o$. Many existing geophysical recording equipments include 24-channel recorder drums and these existing equipments can be readily utilized by paralleling each of the individual seismic traces at the same field time to two separate recording channels. This then allows positioning of the time displaced, phase-opposed pickup heads on separate record channels, the operation and function still being the same as that shown in FIG. 7.

Figure 9:
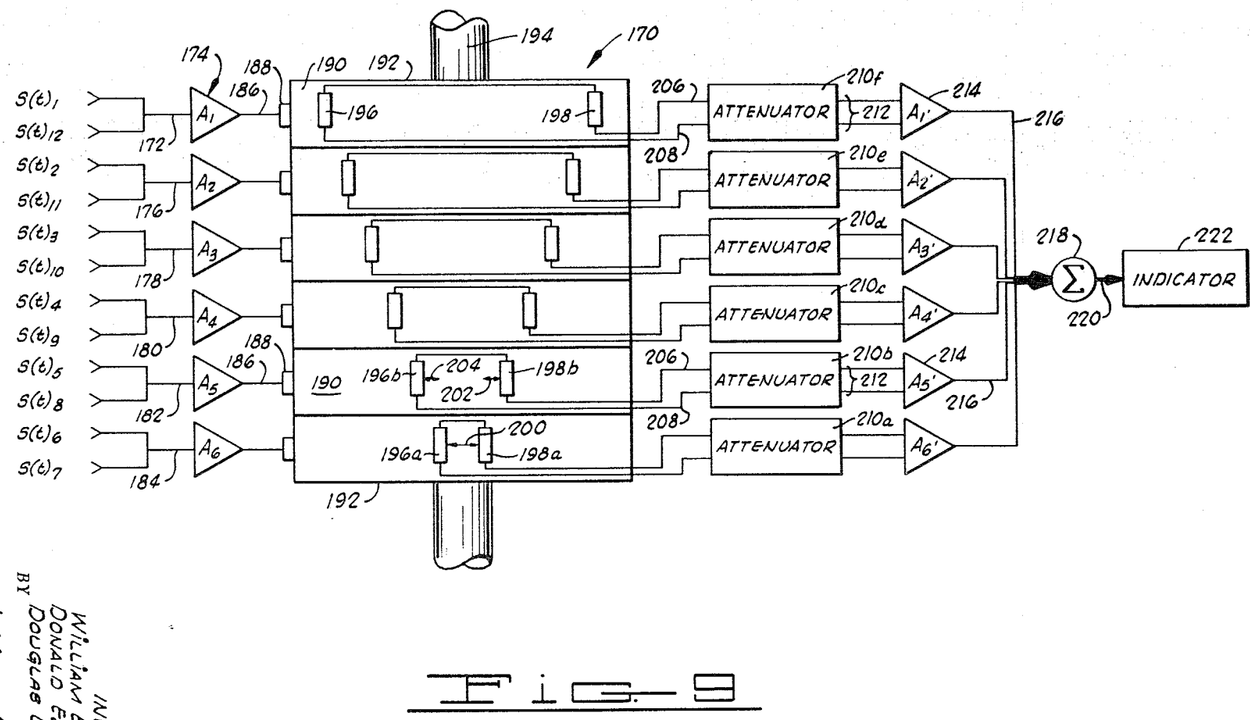
FIG. 9 is a partial schematic drawing illustrating an alternative form of the velocity filtering apparatus.

FIG. 9 shows an alternative form of velocity filtering apparatus 170 which may be employed to carry out the method. Once again, a 12 trace seismogram is shown undergoing a velocity filtering operation but, it should be understood, this is only exemplary and other multiples of field traces can be similarly processed. In FIG. 9, the seismic signal or trace inputs are applied in pairs, pairs of signals being those which have the same detector offset. Thus, the two outermost or end seismic traces from the detector array, $S(t)_1$ and $S(t)_{12}$, are paired and applied on a lead 172 to $A_1$ of the amplifier bank 174. Similarly, the next two outermost trace pairs $S(t)_2$ and $S(t)_{11}$ are applied on a lead 176 to amplifier $A_2$ of the amplifier bank 174. Remaining trace pairs having equal offsets are similarly applied to the amplifier bank 174. That is, the trace signals $S(t)_3$ and $S(t)_{10}$ are applied via lead 178 to amplifier $A_3$, and the remaining trace pairs 4 and 9, 5 and 8, and 6 and 7 are applied on the leads 180, 182, and 184 to the respective amplifiers $A_4$, $A_5$ and $A_6$.

The outputs from each of the amplifiers $A_1$ through $A_6$ are then applied on one of leads 186 to a respective transducer head 188. Each of the transducer heads 188 is positioned in recording alignment with one of the channels 190 which extend about the circumference of a suitable recording drum 192. The recording drum 192 is a commercially available equipment and it receives rotational drive from conventional drive means (not shown) via the shaft 194.

In the same manner as in FIG. 7, each record channel 190 is scanned by a pair of magnetic pickup heads 196 and 198 which are connected in series and in phase opposition, and each pair is displaced along the record channel 190 in accordance with a selected spacing as chosen from considerations of the velocity cut and the respective detector or trace offsets. Thus, the heads 196a and 198a, receiving the center traces $S(t)_6$ and $S(t)_7$ would be spaced apart a distance 200 which would be equal to the selected velocity cut or the $\Delta t$ per trace at the selected apparent velocity limits. Similarly, the heads 196b and 198b receive the next more outward trace pair $S(t)_5$ and $S(t)_8$ and each pickup head is further displaced by the applicable $\Delta t$. That is, the pickup head 198b is advanced in field time by a spatial movement of the pickup head 198b of the amount 202 and the lagging pickup head 196b is further retarded in field time relatively displacing the pickup head 196b by the distance 204. In similar manner, each of the respective pairs of pickup heads 196 and 198 is offset, lagging and leading respectively by the increment $\Delta t$ for each unit of offset spacing.

The outputs from the respective pairs of pickup heads 196 and 198 is then present across leads 206 and 208 as the input to respective attenuators 210. The attenuation may be effected in the same manner as it was in FIG. 7. That is, each of the attenuators 210 serves to decrease the output signal to an amount equal to the reciprocal of $2n-1$ where $n$ is the order of spacing of the trace detection point from the center of the array. Thus, attenuator 210a provides a unity output, attenuator 210b provides a one-third output and the remaining attenuators 210c, d, e, and f provide respective outputs of one-fifth, one-seventh, one-ninth and one-eleventh on the output lead pairs 212 to their respective amplifiers 214. The convolved and properly weighted signals from the respective amplifiers 214 are then conducted on a plurality of leads 216 where they are applied to a summation network 218. Summation network 218 provides a single summed output, a velocity filtered signal, on a lead 220 to a suitable indicator 222, e.g. conventional geophysical recording and/or display equipment.

It should be apparent that the apparatus 170 of FIG. 9 utilizing fewer operating channels achieves the performance of the method in the same manner as the apparatus 130 of FIG. 7. The main difference being that seismic trace signals of similar offset or those which have been detected at the same distance from the center of the detector array (on either side) are combined prior to the velocity filtering operation. In general, it can be stated that the FIG. 7 apparatus is preferable since certain types of geophysical returns do not lend themselves to optimum filtering in the combined signal apparatus 170 of FIG. 9. Also, when utilizing the apparatus 170 of FIG. 9, it has been found that it is desirable in some cases to preprocess each of the seismic trace signals $S(t)_1$ through $S(t)_{12}$ to adjust their respective amplitudes and thereby insure uniformity of signal input.

Figure 10:
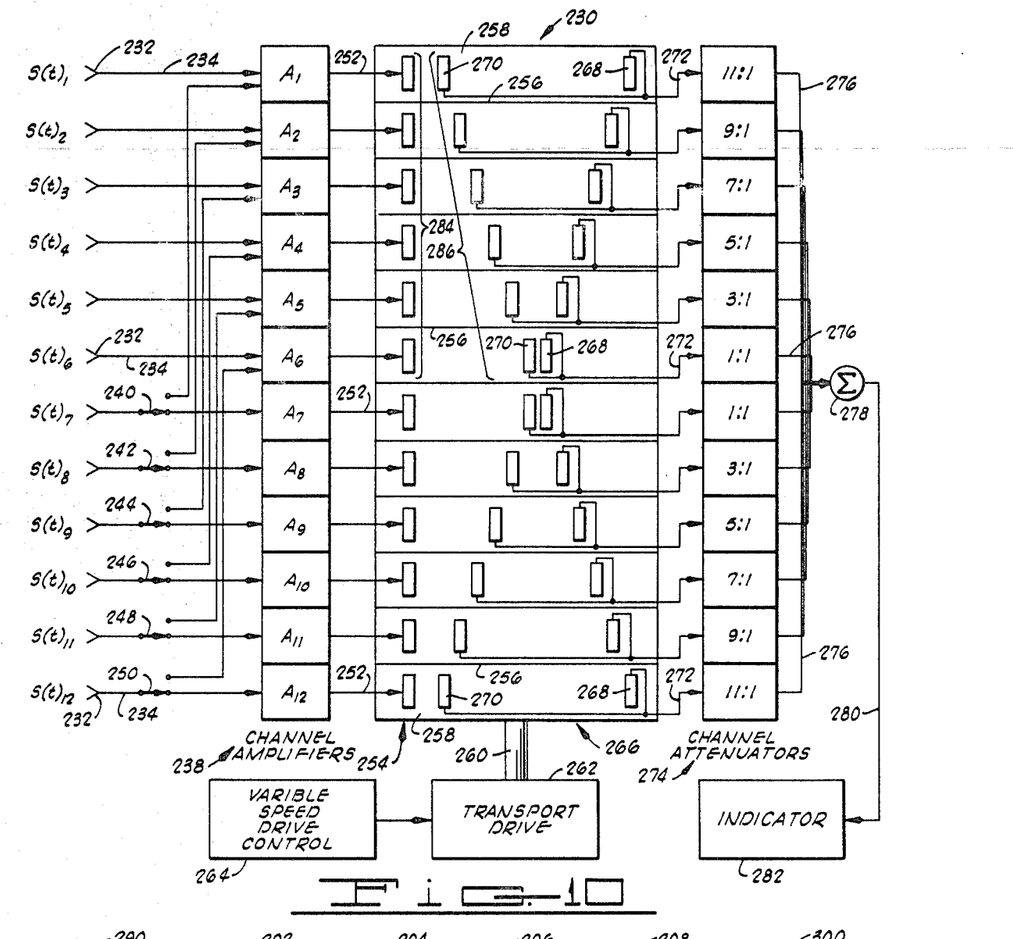
FIG. 10 is a block diagram illustrating still another form of the velocity filtering apparatus.

FIG. 10 illustrates another form of apparatus 230 which allows great flexibility and selection of velocity cutoff limits. Apparatus 230 utilizes head pairs with constant spacing and velocity cutoff selection is effected by means of varying the speed of the recording medium. Using the exemplary twelve trace seismogram again, traces $S(t)_1$ through $S(t)_{12}$ are each applied to the individual inputs 232 for conduction via leads 234 to inputs of respective amplifiers $A_1$ through $A_{12}$ of the channel amplifier bank 238.

A plurality of switches 240, 242, 244, 246, 248 and 250 are included to show that the FIG. 10 apparatus may be employed in a first mode to filter each channel of the seismic trace family through a full, 12 channel velocity filter (as shown in FIG. 7) or, when switches 240—250 are thrown to their other position, in a second mode to velocity filter in pair combinations of trace pairs which are detected at equal distances from the detector array center or reference point. Velocity filtering of paired seismic traces is accomplished in a similar manner to that set forth for FIG. 9 and will be further described below.

With input switches 240 through 250 set as shown, each of the amplified seismic traces from amplifiers $A_1$ through $A_{12}$ is applied on a respective output lead 252 to one of a plurality of time aligned recording heads 254. The recording heads 254 are each positioned in operative relationship with a recording channel 256, and the plurality of channels 256 are provided in parallel relationship on a recording medium 258. The recording medium 258 is here shown to be of the multichannel magnetic drum type which is commonly employed in the geophysical art.

As here shown, the recording medium or drum 258 receives rotational drive via an input shaft 260 from a transport drive 262. The transport drive 262 provides rotational output on shaft 260 in accordance with speed control as exercised from a variable speed drive control 264. Various conventional types of variable speed transport drive mechanism may be employed, it being preferable that the speed accuracy and reliability characteristics be of suitable order. One form of variable speed drive control which would be particularly suitable is the subject matter of U.S. Pat. application No. 391,410 entitled "Motor Control Servo System," filed Aug. 24, 1964 in the name of Brown et al. and assigned to the present assignee, now U.S. Pat. No. 3,361,949.

A plurality of operator spaced head pairs 266 are placed in transducing relationship to each recording channel 256 of the recording medium 258. As set forth previously, the operator spaced head pairs each consist of a leading magnetic head 268 (leading relative to seismic field time) and a trailing magnetic head 270 which is wired in series and in opposite polarity or orientation. Also, the spacing of each of the head pairs, leading head 268 and trailing head 270, is proportionate to the X distance or offset of the particular seismic trace applied on the channel. That is, the more outwardly detected seismic traces demand greater spacing of heads 268 and 270 with proportionate decrease of spacing toward the inner or centrally detected pair of seismic traces.

A plurality of leads 272 conduct the output signals read by the respective ones of spaced head pairs 266 to the inputs of a plurality of attenuation circuits in the channel attenuator bank 274. Here again, the attenuation is carried out in a manner similar to that of FIG. 7. That is, the centermost channels receive no attenuation and provide a unity output while more outward channels receive increasing attenuation to thereby reduce the outputs at a ratio of the reciprocal of $2n-1$, $n$ being the order of trace spacing from the center of the detector array. The individual attenuator circuits of the channel attenuator bank 274 may consist of a variable resistance input to a suitable amplifier circuit as shown in FIG. 7.

The output from each of the attenuator circuits is provided on parallel leads 276 to the input of a summation circuit 278. The summed signal, a velocity filtered seismic trace, is then conducted on a lead 280 to a suitable indicator 282 which may comprise any of the various recording and/or display means which are conventionally employed in geophysical work.

In the operation of the FIG. 10 apparatus 230, the pairs of heads 268 and 270 may be set in a predetermined spacing at the outset of velocity filtering procedure, and thereafter, this setting need not be disturbed since the operator can effect various desired cutoff velocity limits by controlling the record transition time through variable speed drive control 264. That is, if two-point operator spacing is adjusted into the head pairs 268 and 270 having a $\Delta t$ of 6 ms. per trace with transport drive 262 moving the recording medium 258 at 3.6 inches per second, an increase in the speed of recording medium 258 will result in a corresponding reduction of the relative $\Delta t$ per trace. Thus, increasing the speed of record medium 258 to 7.2 inches per second would alter the $\Delta t$ per trace of the spaced head pairs 266 to 3 ms., exactly half of the $\Delta t$ value which was originally adjusted at the 3.6 inches per second record speed.

The aforementioned U.S. Pat. application No. 391,410 would provide stepwise speed adjustment of record speed, and therefore of the cutoff velocity, but continuous speed control may be preferable. The speed control may be calibrated directly in cutoff velocity or milliseconds per trace ($\Delta t$). Practical considerations limit the recording medium speed range to about an 8:1 ratio, the cutoff velocity range being proportional. While this range is sufficient for most applications, an especial interpretation situation may arise which requires greater or different ranges of cutoff velocity and it is only necessary to readjust the spacing of spaced head pairs 266 once and thereafter a different set of cutoff velocities can be realized through variation of the record speed.

The information which is to be velocity filtered can be supplied from either another associated record medium containing a previously recorded shot sequence, or it may be supplied directly from the field geophone nests. The individual seismic traces are applied at inputs 232 through respective amplifiers $A_1-A_{12}$ (channel amplifiers 238) and, thereafter, the seismic trace signals are recorded by the time aligned recording heads 254 on respective channels 256 of the record medium 258. The operator spaced head pairs 266 are physically arranged for a selected basic $\Delta t$ per trace at a given speed, other $\Delta t$'s being enabled by recorder speed changes. For example, if 6 ms. per trace spacing were adjusted into head pairs 266 relative to a 3.6 inch per second record speed, all seismic signals having apparent velocities less than about 18,000 feet per second would be filtered out. This is assuming a 100 foot detector spacing $d$ as considered in previous calculations, FIGS. 1. 2, etc. Thus, increase in the speed of record medium 258 to 7.2 inches per second would raise the velocity cutoff limit to about 36,000 feet per second, all seismic signals of lesser apparent velocity being filtered out. The manner and degree of speed adjustment of record medium 258 is a matter of choice, depending upon the exigencies of the particular situation.

The apparatus 230 will also perform in the paired channel mode of operation, such as described in conjunction with FIG. 9. That is, the switches 240, 242, 244, 246, 248 and 250 can be actuated to their other positions, thereby pairing respective traces $S(t)_7-S(t)_{12}$ with those traces of signals $S(t)_1-S(t)_6$ which have the same offset distance X or distance of detection from the center of the detector array. The paired signals are then amplified in the channel amplifiers $A_1-A_6$, the amplified output being recorded by the group 284 of time aligned recorder heads 254. Velocity filtering can then be effected by a group 286 of spaced head pairs 266 with output through the respective attenuators 274 and subsequent summation of weighted trace pair signals in network 278 for recovery at indicator 282.

Figure 11:
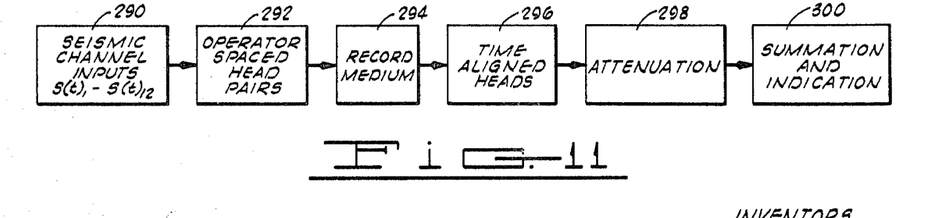
FIG. 11 is a functional block diagram showing an alternative mode of operation of the velocity filtering apparatus.

FIG. 11 illustrates still another alternative of operation of the velocity filtering apparatus. That is, the incoming seismic trace signals may be recorded by operator spaced head pairs (wired in series and opposite polarity) and thereafter read out by a plurality of time aligned heads to thereby effect the required frequency distortion. Thus, the family of previously recorded seismic traces or seismic traces detected directly in the field may be applied at a plurality of inputs 290 (the exemplary 12 channel system again referred to). The individual seismic traces may then be applied to the operator spaced head pairs 292, head pairs 292 being positioned at a preset cutoff velocity spacing upon a plural channel record medium 294. Each of the record channels of record medium 294 is read out by one of a series of time aligned heads 296 and subsequent attenuation stages 298 will provide the desired weighted trace output representation to the summation and indication circuitry 300. Variation of the cutoff velocity limits for FIG. 11 operation may be effected either by variation of the record medium relative to constant spacing of head pairs, or it may be effected by manual or calibrated adjustment of the actual physical spacing of the two-point operator head pairs 292.

The analog method of velocity filtering has several advantages over digital velocity filtering which has been employed heretofore; for example, it enables the use of much existing analog equipment and it is therefore cheaper than would be the necessary digital equipment; also, the time lag from field tape to finished results is much less in an analog type of system; and further, the analog process as disclosed herein can be easily monitored at any of various stages.

It should be understood that the present method may be carried out by apparatus which may vary from that specifically shown herein by the substitution of certain well-known equivalents. It is particularly desirable from the economy standpoint to utilize existing geophysical equipment as much as possible and the present method enables the inclusion of many existing field equipments within the integral velocity filtering apparatus.

Changes may be made in the combination and arrangement of steps or elements as heretofore set forth in this specification and shown in the drawings; it being understood that changes may be made in the embodiments disclosed without departing from the spirit and scope of the invention as defined in the claims.

We claim:

1. The method of filtering multitrace seismic data which represents, by a plurality of traces in analog form, seismic signals detected by a spread of seismic detectors spaced along a line, comprising the steps of:
  reproducing, in analog form, a trace array centered about a space reference point located midway between two adjacent traces of said plurality of traces, said trace array consisting of N+1 of said plurality of traces, where N is an odd integer;
  generating, from said trace array, (N+1)/2 pairs of electrical analog signals, each of said pairs being generated from two traces of said trace array located equidistant from said reference point where the relative amplitude of each pair is proportional to 1/M and the signals of each pair are time shifted with respect to each other by M time units, where M is an odd integer having a value of 1 for the two traces adjacent said reference point and increasing linearly to the value N for the two end traces of said trace array;
  generating, from said pairs, an electrical output signal proportional to the sum of the (N+1)/2 differences between the two signals of each of the (N+1)/2 pairs of signals; and
  forming a visual display from said output signal representative of the filtered data.

2. Apparatus for performing analog wide-band velocity filtering of multitrace seismic signals as detected in a seismic detector array, comprising recording means including transport means and a recording medium and having a plurality of record channels; means receiving and recording said seismic signals on said plurality of record channels in consecutive order as established by the offset of signal detection in the detector array; means for convolving each of said seismic signals said means comprising a plurality of pairs of pickup heads wired in series and in phase opposition, one of said pairs being in operative relationship to each of said plurality of record channels and said heads of each pair being displaced along said record channels in proportion to said respective offsets, said first time points of convolution being progressively advanced by an incremental time which equates to a predetermined apparent velocity cutoff limit of said multitrace seismic signals; means for attenuating said convolved signals by progressively greater amounts from center traces outward in proportion to said offsets; means for summing said convolved and attenuated signals to provide a velocity filtered output; and control means for varying the transport speed of said recording medium such that said delay times and first time points of said means for convolving are effectively varied relative to actual field time of the seismic signals to thereby effect exclusion from the velocity filtered output of all seismic signals having an apparent velocity below a selected limit.